United States Patent [19]

Shibanaka et al.

[11] Patent Number: 5,035,414

[45] Date of Patent: Jul. 30, 1991

[54] METHOD OF CONTROLLING DRIVING OF CONVEYOR MEANS IN AUTOMATIC DOCUMENT CONVEYING DEVICE

[75] Inventors: Mitsugu Shibanaka, Amagasaki; Haruo Yamamoto, Osaka, both of Japan

[73] Assignee: Mita Industrial Co., Ltd., Osaka, Japan

[21] Appl. No.: 441,287

[22] Filed: Nov. 27, 1989

[30] Foreign Application Priority Data

Nov. 30, 1988 [JP] Japan ................................. 300651

[51] Int. Cl.⁵ ............................................. B65H 7/02
[52] U.S. Cl. ..................................... 271/227; 271/259
[58] Field of Search ..................... 271/258, 259, 227

[56] References Cited

U.S. PATENT DOCUMENTS

| 4,519,700 | 5/1985 | Barker | 271/258 X |
| 4,632,376 | 12/1986 | DuBois | 271/258 X |
| 4,825,248 | 4/1989 | Honjo | 271/259 X |
| 4,925,177 | 5/1990 | Nakamura | 271/258 X |

Primary Examiner—Richard A. Schacher
Attorney, Agent, or Firm—Antonelli, Terry, Stout & Kraus

[57] ABSTRACT

A method of controlling the driving of a conveyor in an automatic document conveying device in which the conveyor is positioned opposite a transparent plate in an image processing machine and a reversibly rotatable electric motor for driving the conveyor. In the automatic document conveying device, a sheet-like document fed between the transparent plate and the conveyor is conveyed in a predetermined direction on the transparent plate by applying a normally rotating voltage to the electric motor to rotate the electric motor in a normal direction and drive the conveyor in a predetermined direction. Thereafter, the document is stopped at a required site on the transparent plate by producing a braking action in the electric motor and thus stopping the conveyor. The conveying speed of the conveyor is detected as the conveyor is driven in the predetermined direction is detected. According to the detected conveying speed, the time at which the braking action is produced in the electric motor, and/or at least one of a time at which the application of the normally rotating voltage to the electric motor is stopped and the time at which the braking action is produced in the electric motor is controlled. The braking action is produced by applying a second voltage to the electric motor after the lapse of some time following the stopping of applying of the normally rotating voltage to the electric motor.

10 Claims, 5 Drawing Sheets

METHOD OF CONTROLLING DRIVING OF CONVEYOR MEANS IN AUTOMATIC DOCUMENT CONVEYING DEVICE

FIELD OF THE INVENTION

This invention relates to a method of controlling the driving of a conveyor means in an automatic document conveying device and is to be applied to an image-forming machine such as an electrostatic copying machine.

DESCRIPTION OF THE PRIOR ART

To automate the handling of documents in a copying operation or the like, it is the widespread commercial practice to provide an automatic document conveying device in an image processing machine, such as an electrostatic copying machine. A typical such automatic document conveying device is provided with an opening-closing frame member and a document table. A transparent plate, on which to place a document, is disposed on the upper surface of a housing of the image processing machine. The opening and closing frame member is mounted on the housing so that it can move freely between a closed position at which it covers the transparent plate and an open position at which it leaves the transparent plate open to view. The document table is mounted on the housing adjacent to the opening-closing frame member. A delivery means is provided in relation to the document table, and a conveyor means is disposed in the opening-closing frame member. When the opening-closing frame member is brought to the closed position, the conveyor means is positioned opposite the transparent plate.

In using the above-described automatic document conveying device, the opening-closing frame member is held at the closed position, and a sheet-like document to be positioned on the transparent plate is placed on the document table. The document is delivered from the document table by the delivery means and is fed between the transparent plate and the conveyor means. By rotating an electric motor, drivingly connected to the conveyor means, in a first direction, and thus driving the conveyor means in a required direction, the document is conveyed onto the transparent plate. Then, by producing a braking action in the electric motor, and thus stopping the conveyor means, the conveying of the document is stopped.

The conventional automatic document conveying device of the above-described type, however, has a problem which has yet to be solved. Specifically, there are considerable variations in the effect of stopping the conveyor means by producing a braking force in the electric motor, and therefore, the document cannot be stopped consistently at the required site on the transparent plate. Depending upon the material or size of the document, the stopping position will vary considerably.

To solve this problem, it has been proposed to utilize a special braking mechanism, such as an electromagnetic braking mechanism, capable of producing a very strong braking action to stop the conveyor means instantaneously, to the conveyor means. This, however, would greatly increase the cost of production.

SUMMARY OF THE INVENTION

It is a primary object of this invention to improve a conventional method of controlling the driving of the conveyor means in the automatic document conveying device of an image forming machine, without involving the increase of the cost of production and other problems, and to stop any type of document consistently and precisely at a required site on the transparent plate of the image forming machine.

Another object of this invention is to accurately circumvent adverse effects which control of the driving of the conveyor means in an automatic document conveying device may exert on the controlling of the actions of various movable means in the automatic document conveying device or the controlling of the action of an image processing machine in which the automatic document conveying device is provided.

The present inventors made extensive investigations on the action of the conveyor means in the automatic document conveying device and found that the conveying load on the conveyor means varies considerably, depending upon the material or size of a document to be conveyed, and causes condiderable variations in the conveying speed of the conveyor means at the time of producing braking action in the electric motor; and that these variations in conveying speed cause variations in the effect of stopping the conveyor means and therefore lead to variations in the stopping position of the document.

Further research and experimental work based on the above finding has now led to the discovery that any document can be precisely and consistently stopped at a required site on the transparent plate by detecting the conveying speed of the conveyor means which is driven in a predetermined direction by the rotation of the electric motor in a first direction, and according to this detected conveying speed, controlling the time at which the braking action is produced in the electric motor, or by controlling at least one, of the time when application of a first voltage causing this rotation of the electric motor is stopped and the time when the braking action in the electric motor is started.

The present inventor further found that it is preferred to produce braking action in the electric motor by applying a second voltage to the electric motor; and that in this case, too, by producing a braking action in the electric motor after some time interval from the stopping of the application of the first voltage to the electric motor, it is possible to accurately circumvent adverse effects which control of the driving of the conveyor means in the automatic document conveying device may exert on the controlling of the actions of various movable means in the automatic document conveying device or on the controlling of the action of an image processing machine in which the automatic document conveying device is provided.

According to one aspect of the invention, there is provided a method of controlling the driving of a conveyor means in an automatic document conveying device of the type comprising said conveyor means positioned opposite a transparent plate disposed in an image processing machine and a reversibly rotatable electric motor, for driving the conveyor means to convey a sheet-like document fed between the transparent plate and the conveyor means in a predetermined direction on the transparent plate by applying a first voltage to the electric motor to rotate the electric motor in a first direction and to drive the conveyor means in a predetermined direction, and then stop the document at a required site on the transparent plate by producing a braking action in the electric motor and thus stopping the conveyor means; said method comprising detecting the conveying speed of the conveyor means when it is driven in the predetermined direction by rotating the electric motor in the first direction, and according to the detected conveying speed, controlling the time daring which the braking action in the electric motor is produced.

According to another aspect of the invention, there is provided a method of controlling the driving of a conveyor means in an automatic document conveying device of the type comprising said conveyor means positioned opposite a transparent plate disposed in an image processing machine and a reversibly rotatable electric motor for driving the conveyor means to convey a sheet-like document fed between the transparent plate and the conveyor means in a predetermined direction on the transparent plate by applying a first voltage to the electric motor to rotate the electric motor in a first direction and to drive the conveyor means in a predetermined direction, and then stop the document at a required site on the transparent plate by producing a braking action in the electric motor and thus stopping the conveyor means; said method comprising detecting the conveying speed of the conveyor means when it is rotated in the predetermined direction by rotating the electric motor in the first direction, and according to the detected conveying speed, controlling at least one of the time at which applying the first rotating voltage to the electric motor is stopped and the time at which producing the braking action in the electric motor is started.

According to still another aspect, there is provided a method of controlling the driving of a conveyor means in an automatic document conveying device of the type comprising said conveyor means positioned opposite a transparent plate disposed in an image processing machine and a reversibly rotatable electric motor for driving the conveyor means to convey a sheet-like document fed between the transparent plate and the conveyor means in a predetermined direction on the transparent plate by applying a first voltage to the electric motor to rotate the electric motor in a first direction and to drive the conveyor means in a predetermined direction, and then to stop the document at a required site on the transparent plate by producing a braking action in the electric motor an thus stopping the conveyor means; said method comprising producing a braking force in the electric motor after some time interval from the stopping of applying the first rotating voltage to the electric motor.

DETAILED DESCRIPTION OF THE PREFERRED EMBODIMENTS

Preferred embodiments of the method of controlling an driving of the conveyor means in the automatic document conveying device improved in accordance with this invention will be described in detail with reference to the accompanying drawings.

Figure 1:
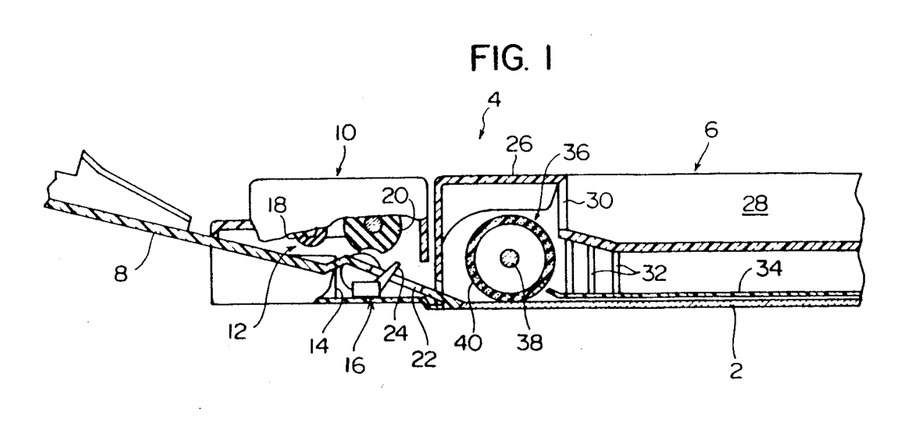
FIG. 1 is a partial simplified sectional view showing one example of an automatic document conveying device to which the control method of this invention is applied.

FIG. 1 illustrates in a simplified manner the principal parts of an automatic document conveying device to which the control method of this invention is applied. A transparent plate 2, which may be made of glass, is disposed on the upper surface of the housing of an image processing machine such as an electrostatic copying machine (the image processing machine is shown only at its transparent plate 2). The automatic document conveying device shown generally at 4 and disposed in relation to the transparent plate 2 includes an opening-closing frame member 6 and a document table 8. The opening-closing frame member 6 is mounted on the housing of the image processing machine such that it is free to pivot about an axis extending in the left-right direction in FIG. 1 between a closed position, at which it covers the transparent plate 2, and an open position, at which it leaves the transparent plate 2 open to view. The document table 8 is mounted on the housing of the image processing machine with its downstream end in contact or proximity with the left edge of the transparent plate 2.

A box-like case 10 is provided in the downstream portion of the document table 8, and a delivery means 12 is disposed within the case 10. A dc reversible electric motor 14 and a detector 16 are also disposed within the case 10. The delivery means 12 is of a known type, including a delivery roller mechanism 18 and a separating roller mechanism 20, and separates a plurality of sheet-like documents placed on the document table 8 and delivers them one by one toward the transparent plate 2. The electric motor 14 constitutes a driving source for the delivery means 12 and concurrently a driving source for a conveyor means to be described. The detector 16 has a detecting arm 24 extending upwardly through an opening 22 formed in the document table 8, and detects a sheet-like document delivered toward the transparent plate 2 from the document table 8.

The opening-closing frame member 6 is box-like with an open bottom, and its left end portion is raised upwardly toward its main portion 28. A document discharge opening 30 is formed in the right side surface of the left end portion 26. A plate member 34 is fixed to the main portion 28 via suspending pillars 32. When the opening-closing frame member 6 is held at the closed position shown, the plate member 34 is positioned opposite the transparent plate 2. The under surface of the plate member 34 is colored white. A conveyor means 36 is disposed in the left end portion 26 of the opening-closing frame member 6.

Figure 2:
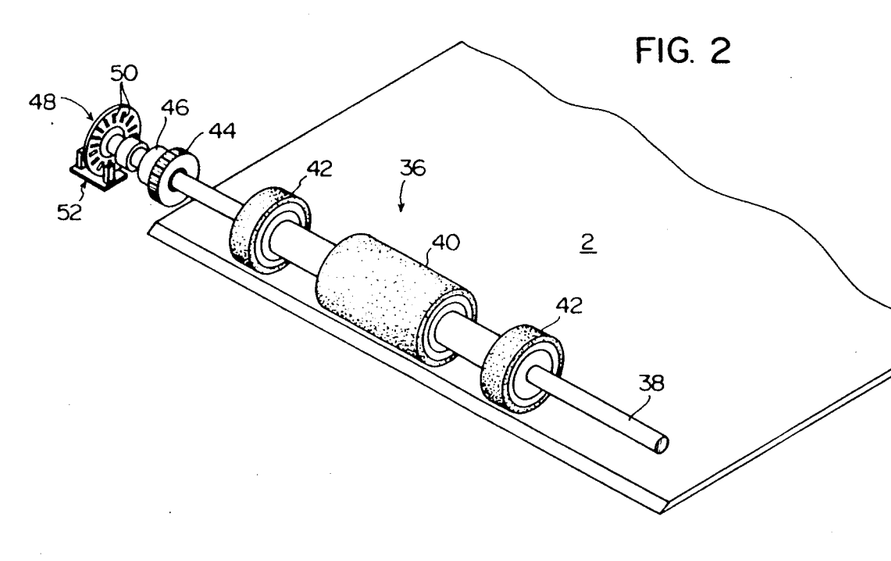
FIG. 2 is a partial perspective view showing a conveyor means in the automatic document conveying device of FIG. 1.

With reference to FIGS. 1 and 2, the conveyor means 36 has a rotatable shaft 38 mounted rotatably on the opening-closing frame member 6. When the opening-closing frame member 6 is held at the closed position, the rotatable shaft 38 extends substantially horizontally on the left end portion of the transparent plate 2. To the rotatable shaft 38 are fixed a relatively wide central roller 40 and relatively narrow side rollers 42, positioned on each side of the central roller 40. The surface layers of these rollers may conveniently be formed of a foamed synthetic resin such as polyurethane foam. If desired, the conveyor means 36 may be constructed of a suitable endless belt mechanism instead of the central roller 40 and the side rollers 42. A gear 44 is mounted rotatably on the rear end portion of the rotatable shaft 38, and a control clutch 46 is also mounted on it. The control clutch 46 connects the gear 44 selectively to the rotatable shaft 38. The gear 44 is drivingly connected to the electric motor 14 via a suitable transmission means (not shown). Accordingly, when the control clutch 46 is set in motion and the gear 44 is connected to the rotatable shaft 38, the rotatable shaft 38 is drivingly connected to the electric motor 14. A detection disc 48 is also fixed to the rear end portion of the rotatable shaft 38. A plurality (for example, 45) of holes 50 are formed at equidistant positions around the disc 48 in the circumferential direction. In relation to the disc 48, a detector 52 is provided. The detector 52 has a light emitting element positioned on one side of the disc 48 and a light receiving element on the other side of the disc. When the rotatable shaft 38 is rotated and the disc 48 is correspondingly rotated, the detector 52 produces a pulse every time one hole 50 passes between the light emitting element and the light receiving element. By counting the number of such pulses, the amount of rotation of the rotatable shaft 38 (and therefore, the amount of conveyance of the conveyor means 36) can be detected. By measuring the time interval from one pulse to the next, the rotatable speed of the rotating shaft 38 (and therefore, the conveying speed of the conveyor means 36) can be detected.

The mechanical structure of the illustrated automatic document conveying device 4 does not constitute the novel features of the present invention, and may be substantially the same as that of the automatic document conveying device disclosed in the specification and the drawings of the Applicant's copending Japanese Pat. application No. 61,333/1988 (filed on Mar. 15, 1988; entitled "AUTOMATIC DOCUMENT CONVEYING DEVICE). Accordingly, for a detailed description of the mechanical structure of the illustrated automatic document conveying device 4, see the specification and drawings of Japanese Pat. application No. 61,333/1988.

The operation of the conveyor means 36 in the automatic document conveying device 4 and the controlling of its driving will now be described.

In feeding a document on the document table 8 onto the transparent plate 2, the operator depresses a document feeding switch (not shown). As a result, application of a first voltage to the electric motor 14 is started, and the electric motor 14 begins to rotate in a first direction. Then, the control clutch means (not shown) of the delivery means 12 is actuated for some time and the delivery means 12 is connected to the electric motor 14 for some time. A sheet-like document is delivered from the document table 8 by the action of the delivery means 12. As a result, the detector 16 detects the leading edge of the delivered document (in other words, the leading edge of the delivered document acts on the detecting arm 24 of the detector 16). When a predetermined period of time elapsed from the time when the detector 16 detected the leading edge of the document, the control clutch 46 of the conveyor means 36 is set in operation, and thus, the rotatable shaft 38 is drivingly coupled to the electric motor 14. The above predetermined time is set at a time period slightly shorter than the time required for the leading edge of the document delivered from the document table 8 to arrive at a site between the rollers 40 and 42 of the conveyor means 36 and the transparent plate 2 after the document acted on the detector 16. When the rotatable shaft 38 is drivingly connected to the electric motor rotating in a normal direction via the control clutch 46, the rollers 40 and 42 of the conveyor means 36 begin to be rotated counter clockwise in FIG. 1, and therefore, the conveyor means 36 conveys the document fed between the rollers 40 and 42 and the transparent plate 2 to the right in FIG. 1. Thereafter, the detector 16 detects the trailing edge of the document (in other words, the trailing edge of the document passes the detection arm 24 of the detector 16, and the document departs from the detection arm 24).

Figure 3:
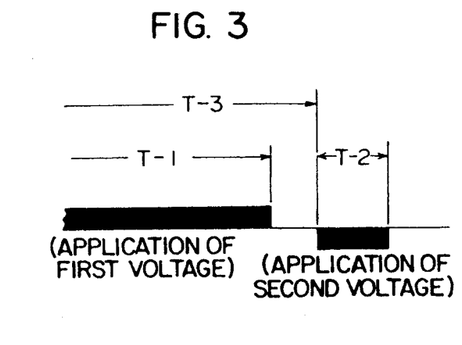
FIG. 3 is a diagram illustrating the timing of the application of a voltage to the electric motor in a preferred embodiment of the controlling method of this invention.

With reference to FIG. 3 in conjunction with FIGS. 1 and 2, when a predetermined time T-1 elapsed from the time when the detector 16 detected the trailing edge of the document, the application of the first voltage to the electric motor 14 is stopped. Then, by applying a second voltage to the electric motor 14 for a required period of time, a braking action is produced in the electric motor 14. Thus, the rotation of the rollers 40 and 42 of the conveyor means 36 is stopped, and the document is stopped at the required position on the transparent plate 2 (for example, a site at which the trailing edge of the document is in alignment with a standard position relative to the left end portion of the transparent plate 2). Furthermore, the control clutch 46 is consequently rendered inoperative. Preferably, some time interval of, for example, about 10 msec is provided between the stopping of application of the first voltage to the electric motor 14 and the starting of application of the second voltage. When the stopping of application of the first voltage to the electric motor 14 and the starting of application of the second voltage to it are carried out at the same time, an abrupt increase in load current is likely to exert undesirable electrically adverse effects on the automatic document conveying device 4 and the control means for the image processing machine in which the automatic document conveying device is provided. When the document is positioned on the transparent plate 2 as above, it is scanned and exposed if the image processing machine is an electrostatic copying machine. Thereafter, a second voltage is applied to the electric motor 14 to rotate the motor 14 in the opposite direction. Furthermore, the control clutch 46 is actuated to connect the rotatable shaft 38 drivingly to the electric motor 14. Thus, the rollers 40 and 42 of the conveyor means 36 are rotated clockwise in FIG. 1, and the document on the transparent plate 2 is conveyed along the peripheral surfaces of the rollers 40 and 42 by the guiding action of a deflecting piece (not shown) and discharged through the document discharge opening 30. Then, the application of the second voltage to the electric motor 14 is stopped and the control clutch 46 is rendered inoperative.

When the document is positioned at the required site on the transparent plate 2, a braking action is produced in the electric motor by applying the second voltage to the electric motor 14 after the application of the first voltage to the electric motor 14 has stopped, as stated above. But as can be clearly understood from comparative examples given hereinbelow, considerable variations exist in the stopping effect of the document by the braking action, depending upon the material or size of the document fed to the transparent plate 2. Accordingly, to position the document consistently and precisely at the required site on the transparent plate 2, the variations have to be properly compensated for. Investigations of the present inventors show that the conveyance load on the conveyor means 36 considerably differs depending upon the material and size of the document, and, therefore, the conveying speed of the document by the conveyor means 36 at the time of applying the first voltage to the electric motor 14 considerably differs, and thus considerable variations occur in the stopping effect of the document by the braking action. Accordingly, in this invention, the conveying speed of the conveyor means 36 is detected when the electric motor 14 is rotated in the first direction by applying the first voltage to it and the document is conveyed by the conveyor means 36. Conveniently, this conveying speed can be detected by measuring the time TS between the time when, after the detection of the trailing edge of the document conveyed by the conveyor means 36 by the detector 16, the detector 52 detects the first hole 50 of the disc 48 fixed to the rotatable shaft 38 and produces the first pulse and the time when the detector 52 detects the second hole 50 and produces the second pulse.

With reference to FIGS. 1 to 3, to compensate for the variations in the stopping effect of the document dependent on the document conveying speed by the conveyor means 36, the present invention controls the time T-2 during which the second voltage is applied to the electric motor 14 to produce a braking action, according to the conveying speed detected. When the conveying speed of the conveyor means 36 is relatively large, the time T-2 is set at a relatively long period of time, and when the conveying speed of the conveying means 36 is relatively small, the time T-2 is set at a relatively short period of time. In addition to, or in place of, controlling the time T-2, it is possible to control the time T-1 between the time when the detector 16 detects the trailing end of the document and the time when the application of the first voltage to the electric motor 14 is stopped. It is also possible to control the time T-3 between the time when the detector 16 detected the trailing end of the document and the time when the application of the second voltage to the electric motor 14 is started. When the conveying speed by the conveyor means 36 is relatively large, the time T-1 or time T-3 is a relatively short period of time, and when the conveying speed is relatively low, the time T-1 or T-3 is a relatively long period of time. By properly compensating for the variations in the stopping effect of the document by the braking action, the document can be consistently and precisely positioned at the required site on the transparent plate 2 irrespective of its material or size.

EXAMPLES AND COMPARATIVE EXAMPLES

COMPARATIVE EXAMPLE 1

In the automatic document conveying device shown in FIGS. 1 and 2, sheet-like plain papers of the various materials and sizes shown below were used as documents and were introduced onto the transparent plate. The electric motor in the automatic document conveying device was a reversible dc motor sold as "Mini DC Motor (rated rotation speed 200 rpm) by Copal Co., Ltd. The surface layers of the central roller and side rollers in the conveyor means were formed of foamed polyurethane sold under the tradename "EMO" by Inoue MTP Co., Ltd. The outside diameters of these rollers were 33 mm.

Forty-five holes were formed circumferentially at equidistant positions in the detection disc fixed to the rotatable shaft of the conveyor means. The circumferential width of each hole and the circumferential distance between adjacent holes were both 0.9 mm. By detecting the holes, the number of pulses produced and spaces between the pulses per revolution of the rotating shaft was 90.

The plain papers used as documents were as follows:

Standard paper (basis weight 64 g/m$^2$) sold under the tradename "SK" by Sanyo Kokusaku Pulp Co., Ltd.;

standard paper (basis weight 64 g/m$^2$) sold under the tradename "BM" by Daishowa Papermaking Co., Ltd.;

standard paper (basis weight 75 g/m$^2$± called "NEKOOSA No. 4" which is widely used in U. S. A.; and standard paper (basis weight 80 g/m$^2$) called "NEUSIEDLER" and widely used in European countries.

The sizes were A-3, A-4, A-5, B-4, B-5 and B-6 under JIS (Japanese Industrial Standards).

Figure 4:
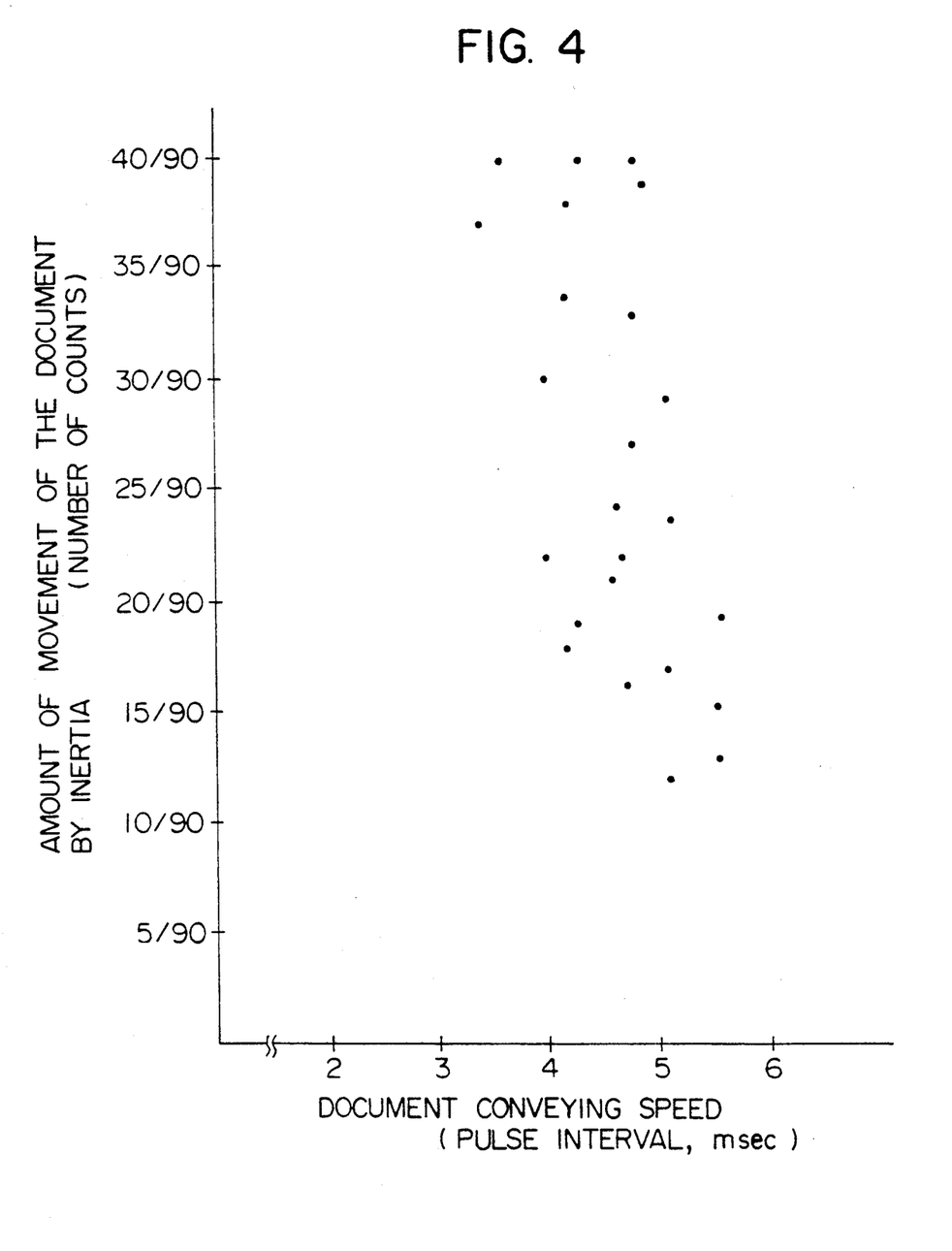
FIGS. 4, 5, 6 and 7 are diagrams respectively showing the document conveying speeds and the amounts of the movement of the document by inertia in Comparative Examples 1 and 2 and Examples 1 and 2, respectively.

The time between the time when after the detection of the trailing end of the document by the detector for detecting the introduced document, the detector for detecting the holes of the disc produced the first pulse and the time when it produced the second pulse was measured, and the speed of conveying the document by the conveying means was determined. After the lapse of T−1=50 msec from the time when the detector detected the trailing edge of the document, the application of a first voltage (24 V) to the electric motor was stopped (no braking action was produced in the electric motor). The amount of the rotation of the rotatable shaft of the conveyor means by inertia until it completely stopped, (i.e., the amount of the movement of the document by inertia), was determined by counting the number of pulses produced by the detector and spaces between the pulses. The results are shown in FIG. 4. There were very great variations in the amount of movement of the document by inertia.

COMPARATIVE EXAMPLE 2

Figure 5:
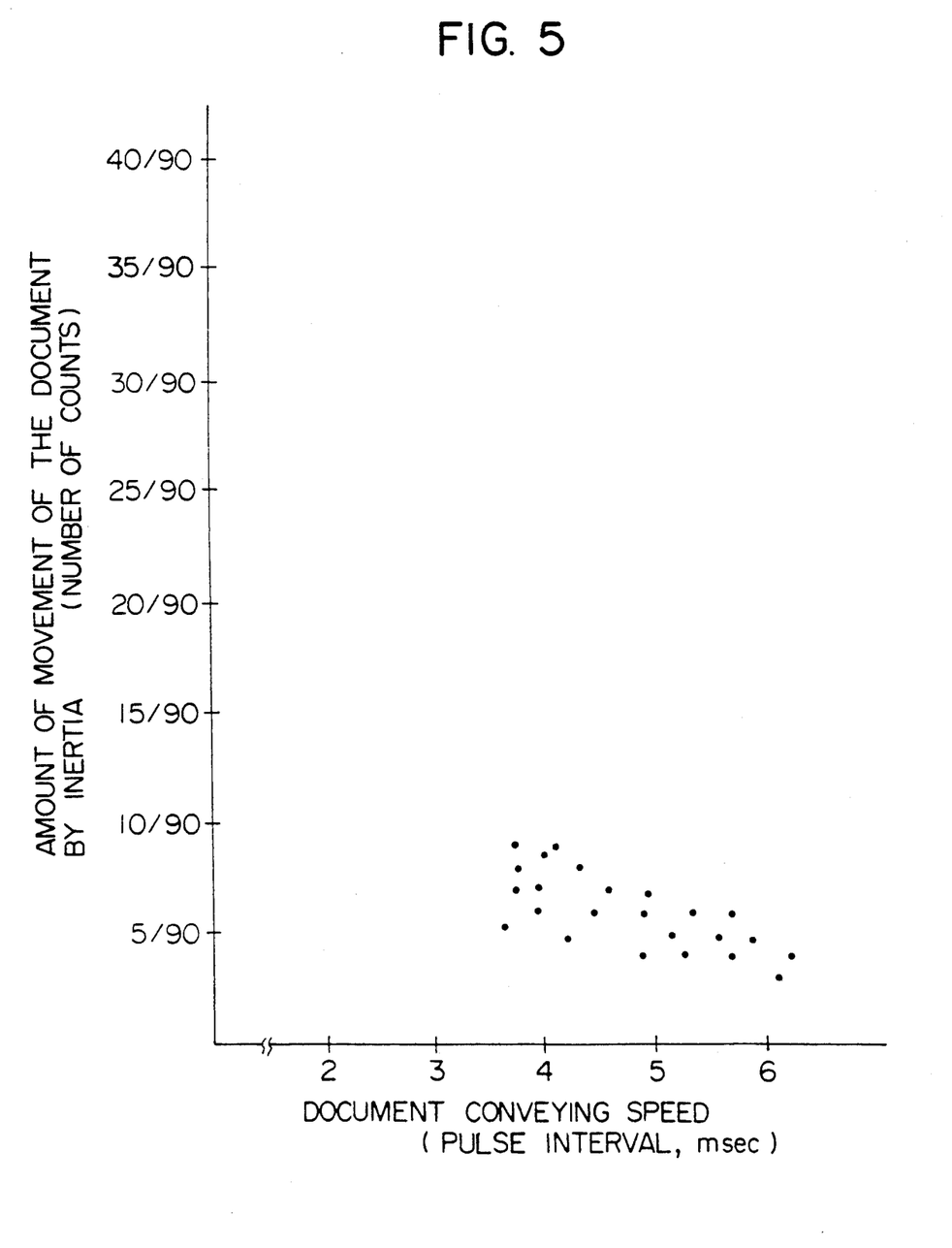

The document conveying speed of the conveyor means and the amount of movement of the document by inertia were determined in the same way as in Comparative Example 1 except that 10 msec after the stopping of the application of the first voltage to the electric motor, an second voltage (24 V) was applied to the electric motor for T−2=20 msec to produce a braking action in the electric motor. The results are shown in FIG. 5. The variations in the amount of movement of the document by inertia became considerably less than those in Comparative Example 1, but were still great.

EXAMPLE 1

Figure 6:
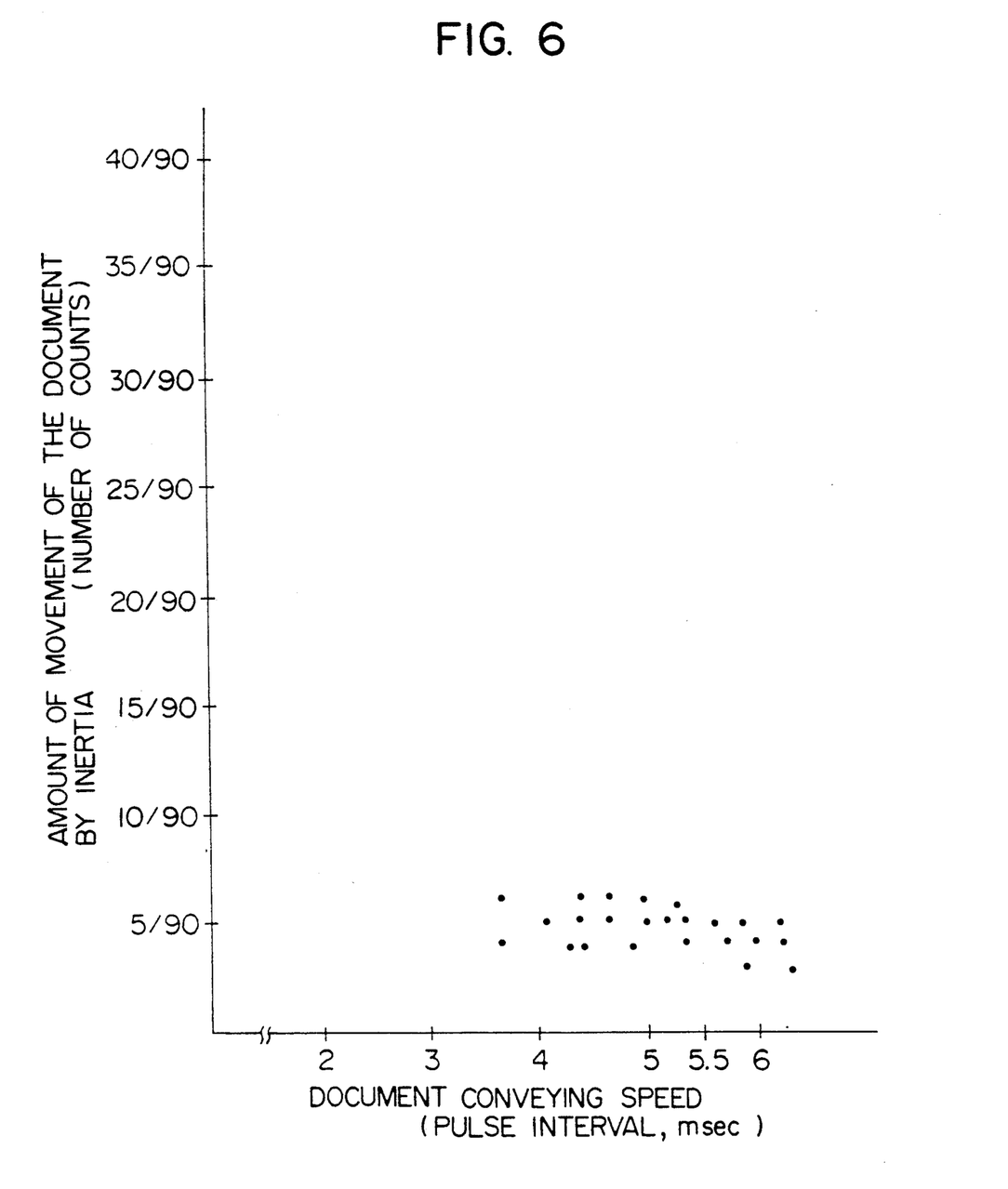

The document conveying speed of the conveyor means and the amount of movement of the document by inertia were determined in the same way as in Comparative Example 2 except that when the document conveying speed of the conveyor means was relatively high and the pulse interval was 3 to 5.5. msec, the time during which the second voltage was applied was set at T−2=27 msec, and when the document conveying speed of the conveyor means was relatively low and the pulse interval was 5.5 to 7 msec, the time during which the second voltage was applied was set at T−2=20 msec. The results are shown in FIG. 6. The variations in the amount of movement of the document by inertia were very small.

EXAMPLE 2

Figure 7:
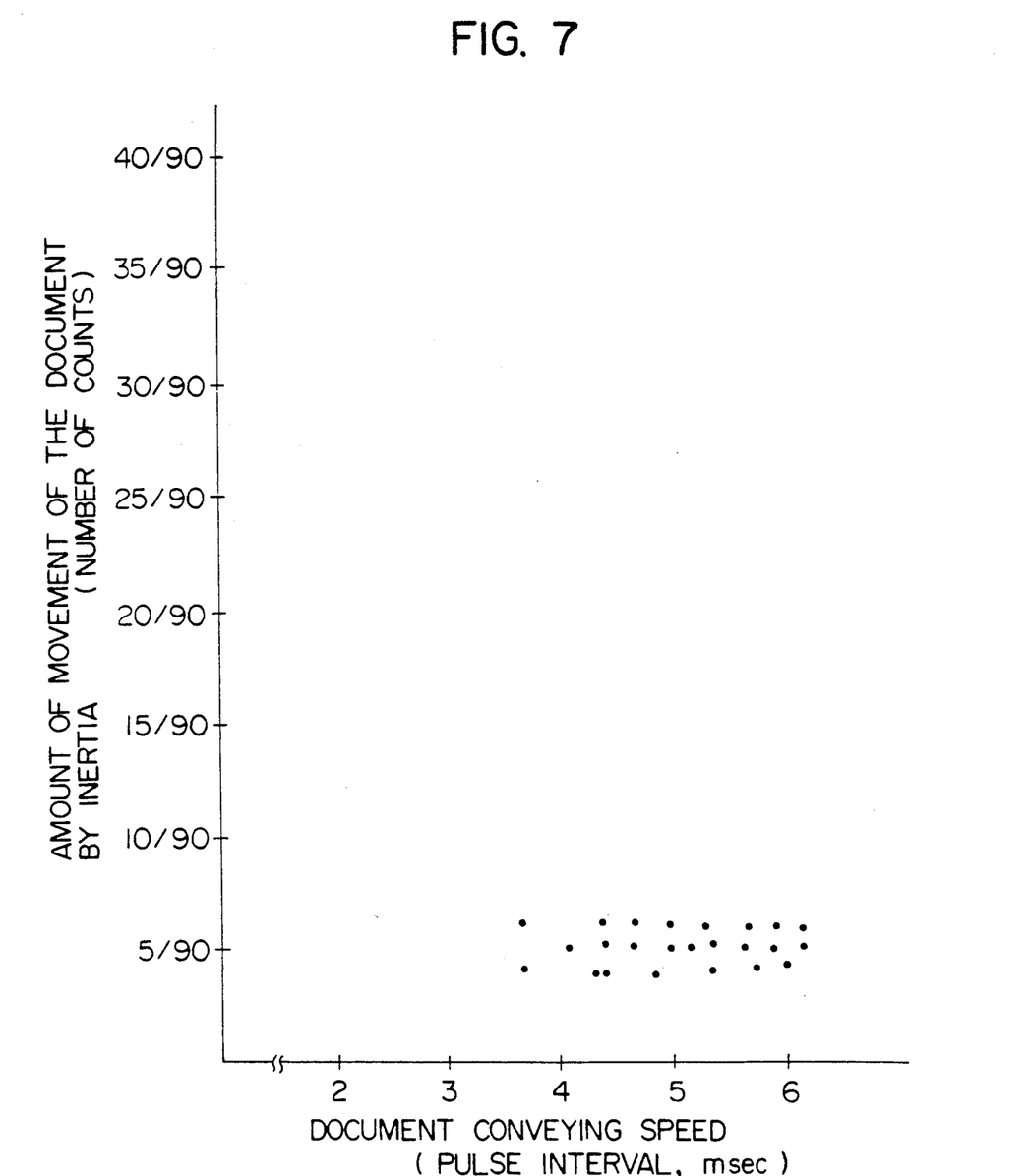

The document conveying speed of the conveyor means and the amount of movement of the document by inertia were determined in the same way as in Example 1 except that when the document conveying speed of the conveyor means was relatively low and corresponded to a pulse interval of 5.5 to 7 msec, both the time at which the application of the first voltage to the electric motor was stopped (therefore, T-1) and the time at which the application of the second voltage to the electric motor was started (therefore, T-3) were delayed by the pulse interval (that is, 5.5 to 7 msec). The results are shown in FIG. 7, and the variations in the amount of movement of the document by inertia were very small.

We claim:

1. A method of controlling the driving of a conveyor means in an automatic document conveying device of the type comprising said conveyor means positioned opposite a transparent plate in an image processing machine and a reversibly rotatable electric motor for driving the conveyor means to convey a sheet-like document fed between the transparent plate and the conveyor means in a predetermined direction on the transparent plate by applying a first voltage to the electric motor to rotate the electric motor in a first direction and drive the conveyor means in a predetermined direction, and then to stop the document at a required site on the transparent plate by producing a braking action in the electric motor and thus stopping the conveyor means; said method comprising detecting the conveying speed of the conveyor means when the conveyor means is driven in the predetermined direction, and according to the detected conveying speed, determining the time during which the braking action is to be produced, and producing the braking action during the determined time.

2. The method of claim 1 in which the braking action is produced in the electric motor by applying a second voltage to the electric motor.

3. The method of claim 2 in which the braking action is produced by stopping the applying of the first voltage to the electric motor, waiting for a time interval, and then applying the second voltage to the electric motor.

4. The method of claim 3 further comprising controlling, according to the detected conveying speed, at least one of the time at which the application of the first voltage to the electric motor is stopped and the time at which the application of the second voltage to the electric motor is started.

5. A method of controlling the driving of a conveyor means in an automatic document conveying device of the type comprising said conveyor means positioned opposite a transparent plate in an image processing machine and a reversibly rotatable electric motor for driving the conveyor means to convey a sheet-like document fed between the transparent plate and the conveyor means in a predetermined direction on the transparent plate by applying a first voltage to the electric motor to rotate the electric motor in a first direction and drive the conveyor means in a predetermined direction, and then to stop the document at a required site on the transparent plate by stopping applying of the first voltage to the electric motor and producing a braking action in the electric motor and thus stopping the conveyor means; said method comprising detecting the conveying speed of the conveyor means when the conveyor means is driven in the predetermined direction, and according to the detected conveying speed, controlling at least one of the time at which applying of the first voltage to the electric motor is stopped and the time at which producing of the braking action in electric motor is started.

6. The method of claim 5 in which the braking action is produced in the electric motor by applying a second voltage to the electric motor.

7. The method of claim 6 further comprising waiting for an interval of time between the stopping of applying of the first voltage to the electric motor and starting of producing of the braking action in the electric motor.

8. A method of controlling the driving of a conveyor means in an automatic document conveying device of the type comprising said conveyor means positioned opposite a transparent plate in an image processing machine and a reversibly rotatable electric motor for driving the conveyor means to convey a sheet-like document fed between the transparent plate and the conveyor means in a predetermined direction on the transparent plate by applying a first voltage to the electric motor to rotate the electric motor in a first direction and drive the conveyor means in a predetermined direction, and then to stop the document at a required site on the transparent plate by producing a braking action in the electric motor and thus stopping the conveyor means; said method comprising stopping the applying of the first voltage to the electric motor, waiting for a time interval, and then producing the braking action in the electric motor.

9. The method of claim 8 in which the braking action is produced in the electric motor by applying a second voltage to the electric motor.

10. The method of claim 8 further comprising detecting the conveying speed of the conveying means when the conveying means is driven in the predetermined direction, and controlling the duration of the time interval in accordance with the detected conveying speed.

* * * * *